(12) United States Patent
Lee et al.

(10) Patent No.: US 7,132,137 B2
(45) Date of Patent: Nov. 7, 2006

(54) VERTICAL ALIGNMENT POLYIMIDE AND VERTICAL ALIGNMENT FILM COMPOSITIONS FOR LCD

(75) Inventors: Chein-Dhau Lee, Hsinchu (TW); Hui-Mei Liu, Hsinchu (TW); Kua-Hua Shen, Hsinchu (TW); Jia-Ming Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 347 days.

(21) Appl. No.: 10/891,072

(22) Filed: Jul. 15, 2004

(65) Prior Publication Data
US 2005/0042393 A1 Feb. 24, 2005

(51) Int. Cl.
C09K 19/52 (2006.01)
C08G 69/12 (2006.01)
C08G 69/26 (2006.01)
C08G 69/32 (2006.01)
C08G 73/10 (2006.01)

(52) U.S. Cl. .................. 428/1.26; 428/473.5; 528/310; 528/322; 528/353

(58) Field of Classification Search ............... 428/1.26, 428/473.5; 528/310, 322, 353
See application file for complete search history.

(56) References Cited

U.S. PATENT DOCUMENTS

| 5,759,442 A * | 6/1998 | Auman et al. .......... 252/299.4 |
| 5,954,999 A * | 9/1999 | Mishina et al. ......... 252/299.4 |
| 6,074,709 A * | 6/2000 | Ezzell et al. ................ 428/1.3 |
| 6,455,208 B1 * | 9/2002 | Yamashiki et al. ............ 430/7 |

* cited by examiner

Primary Examiner—Shean C Wu
(74) Attorney, Agent, or Firm—Bacon & Thomas

(57) ABSTRACT

A vertical alignment polyimide for LCD has the following structure:

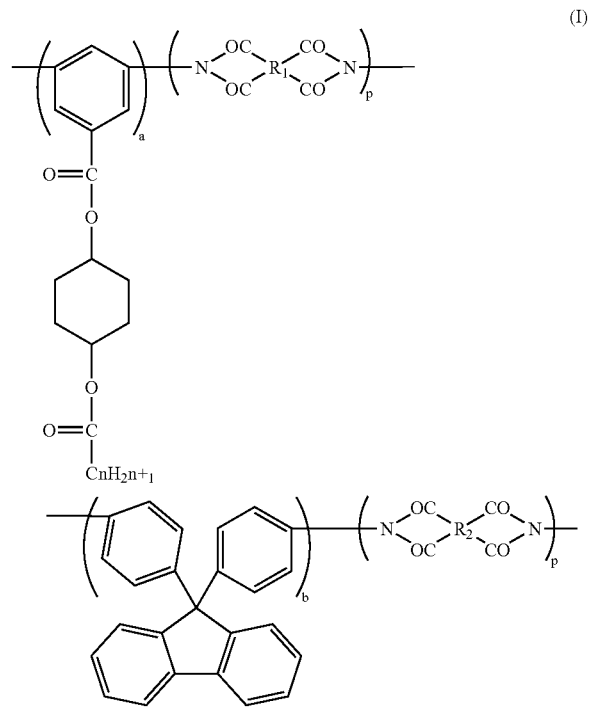

wherein $R_1$ and $R_2$ are same or different tetravalent aromatic residues or alkyl residues; n is an integer, and $24 \geq n \geq 6$; a:b=1:9 to 9:1, preferably from 4:1 to 1:1; and a+b=p+q. The polyimide has an inherent viscosity of 0.04–5 dl/g.

15 Claims, No Drawings

VERTICAL ALIGNMENT POLYIMIDE AND VERTICAL ALIGNMENT FILM COMPOSITIONS FOR LCD

FIELD OF THE INVENTION

The present invention relates to a vertical alignment film composition for LCD, which comprises a polyimide resin (A), an organic solvent (B) capable of dissolving said resin, and a planarization promoter (C) for generating a uniform coating. Said composition can be used to form a film coating on an ITO glass of LCD as a vertically alignment film for liquid crystal molecules.

BACKGROUND OF THE INVENTION

Liquid crystal display (LCD) plays an important role in the photonics industry and has explosive growth in recent years. Demands on the LCD increase rapidly with spreading applications in various electronic products. Electronic products equipped with a LCD device include: mobile phones, personal digital assistance (PDA), notebook computers, liquid crystal monitors, and recently the LCD-TV, etc.

Polyimide (PI) is widely used as a protective material or an insulation material in the electronic field due to its good properties, e.g. high mechanical strength, high thermal resistance, and solvent resistance. Polyimide is also used to form an alignment film for LCD, which can provide a uniform and stable alignment effect to the liquid crystal molecules.

A stable and high pretilt angle of the LCD alignment film is difficult to be obtained by a rubbing process. In order to solve this problem, JP-A-62-297819 discloses an alignment film produced by mixing a long chain aliphatic compound; and JP-A-64-25126 discloses an alignment film comprising an aliphatic diamines. The abovementioned patents provide a feasible method of introducing an aliphatic compound to generate the pretilt angle, but lead to two problems which will be discussed in the following.

An alignment film made of polyimide introduced with long aliphatic groups has the problems of a poor thermal stability and an unstable pretilt angle. When the alignment film with aliphatic groups is subjected to an isotropic temperature of a liquid crystal, the pretilt angle thereof will reduce; although the pretilt angle will promptly increase after injection of the liquid crystal. Temperature of 200~300° C. is normally adapted to cure the alignment film. Due to its poor thermal stability, however, an alignment film with long aliphatic groups will generate problems such as a reduced or non-uniform pretilt angle after the high temperature baking treatment.

In addition, when long aliphatic groups are introduced into a polyimide, the surface hydrophobia of the resulting alignment film will cause a reduced wettability to liquid crystal. If more aliphatic groups are introduced in order to increase the pretilt angle, the wettability thereof to liquid crystal will be further reduced to generate a poor display quality of the LCD device.

It is desirable to develop an alignment film having a high pretilt angle, a good thermal stability, and a good wettability to liquid crystal.

U.S. Pat. No. 5,783,656 discloses a polyamic acid introduced with a novel long alkyl structure; U.S. Pat. No. 6,111,059 discloses a method for introducing a novel long alkyl structure into a diamino monomer; and Japanese Patent Laid-Open 2000-63515A discloses a cyclic aliphatic dianhydride introduced with a novel long alkyl structure.

Furthermore, U.S. Pat. No. 5,954,999 discloses a method for generating the pretilt angle by introducing a long alkyl into the soluble polyimide moiety. The drawbacks of this method include: the long alkyl chain group rotates easily and does not generate enough steric hindrance, causes the unstable pretilt angle properties of liquid crystals and poor alignment uniformity.

Therefore, it is desirable to provide a material fulfilling the requirements for vertical aligning (VA mode) LCD with the properties of: a high pretilt angle, a controllable vertical alignment of liquid crystal, forming no scratch or flaking, easy in synthesis, a high transparency, a uniform alignment, and a good thermal stability.

SUMMARY OF THE INVENTION

One objective of the present invention is to provide a vertical alignment film composition for LCD, which is substantially free of scratching or flaking.

Another objective of the present invention is to provide a vertical alignment film composition for LCD for producing an alignment film having a high transparency via a coating/drying process.

Still another objective of the present invention is to provide a vertical alignment composition for LCD fulfilling the requirement of a high pretilt angle for a vertical alignment type LCD.

Still another objective of the present invention is to provide a vertical alignment composition for LCD, which is easy in synthesis.

Still another objective of the present invention is to provide a vertical alignment composition for LCD fulfilling the requirements of a uniform alignment and a good thermal stability.

In order to achieve the abovementioned objectives, the present invention discloses a polyimide for a vertical alignment film composition for LCD having the following structure (I):

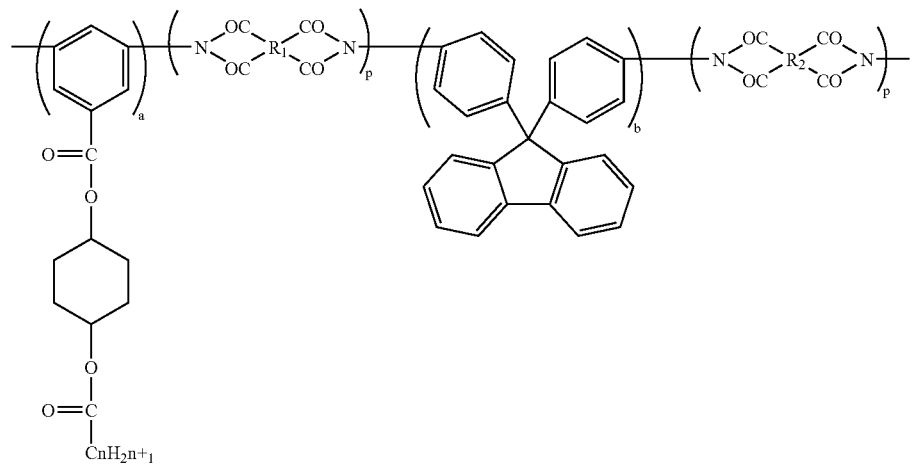

wherein $R_1$ and $R_2$ are same or different tetravalent aromatic residues or alkyl residues; n is an integer, and $24 \geq n \geq 6$; a:b=1:9 to 9:1, preferably from 4:1 to 1:1; and a+b=p+q. The polyimide has an inherent viscosity of 0.04–5 dl/g, which is measured as a polyimide solution having a concentration of 0.5 g/dl in N-methyl-2-pyrrolidone (NMP) and at 25° C.

Preferably, n is 12.

DETAILED DESCRIPTION OF THE INVENTION

The present invention discloses a polyimide for a vertical alignment film composition for LCD having the abovementioned structure (I). An applicable method for synthesizing the polyimide (I) comprises reacting the following two diamines (DA1 and 9,9-Bis-(4-aminophenyl)fluorene) with one or two dianhydrides, preferably one dianhydride, in a suitable solvent for forming a polyamic acid via a condensation reaction:

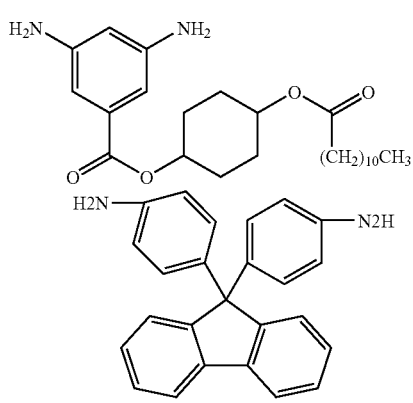

(DA1)

9,9-Bis-(4-aminophenyl)fluorene further heating the reaction mixture containing said polyamic acid to enable cyclization of said polyamic acid in order to form the polyimide (I).

A dianhydride suitable for synthesis of said polyimide (I) is not specifically limited and can be any known tetracarboxylic acid dianhydride used in synthesis of polyimide in the prior art.

The present invention also discloses a vertical alignment film composition for LCD which includes:
(A) a polyimide having the abovementioned structure (I);
(B) an organic solvent capable of dissolving said polyimide (I); and
(C) a planarization promoter capable of promoting a uniform coating of the composition after drying thereof.

The abovementioned composition can be used to form a film on an ITO glass of LCD and capable of controlling the vertical alignment of liquid crystal molecules.

The abovementioned organic solvent (B) includes (but not limit to) an amido solvent, e.g. NMP (N-methylpyrrolidone); an ethylene glycol ether, e.g. BC (butyl cellulose); or a mixture thereof. Preferably, said organic solvent (B) is a mixture solvent of an amido solvent and an ethylene glycol ether solvent in a ratio of 80:20~50:50, more preferably, 70:30~60:40.

The abovementioned planarization promoter (C) includes a non-ionic surfactant capable of reducing the surface tension of the vertical alignment film composition, e.g. polyethylene glycol perfluoroalkyl ether and polypropylene glycol perfluoroalkyl ether.

Preferably, the vertical alignment film composition of the present invention includes, based on the total weight of said composition, 0.1~0.001% (preferably 0.1~0.01%) of said planarization promoter (C).

Preferably, the vertical alignment film composition of the present invention has a non-volatile content which is in a weight ratio of 3~10%, more preferably 4~8%.

The present invention will be further elaborated by way of the following examples which are used for illustration only and not for limiting the scope of the present invention.

PREPARATION EXAMPLE 1

Synthesis of special diamino monomer: 3,5-diamino-benzoic acid 4-dodecarboxyl-cylcohexyl ester (DA1)

In a 250 ml container 6.20 g of 3,5-dinitro-benzoic acid 4-hydroxy-cylcohexyl ester, 6.1 g of liquid lauryl acid chloride, 2.4 g of pyridine were dissolved in 100 ml of tetrahydrofuran (THF). The mixture was stirred for 12 hours, and the organic layer thereof was decanted into 0.5 L of deionized water. After 30 minutes of thorough mixing, a precipitate was formed, which was filtered by a ceramic filtration funnel to collect the resulting solid. The solid was washed with 0.5 L of deionized water once. Next, the solid was dried in vacuo (100° C., 3 hours) to obtain product DN1, 3,5-dinitro-benzoic acid 4-dodecarboxyl-cylcohexyl ester with a melting point of 125° C.

In a 250 ml container 200 ml of THF, 10 g of DN1 white solid, 2 g of Pd/C (a Pd catalyst deposited on carbon), and 50 ml of cyclohexene were added. The resulting mixture was heating under reflux for 3–4 hours. A TLC (thin layer chromatography) plate was used to confirm that the starting compounds had all disappeared. The resulting solution was cooled to a slightly warm temperature. The slightly warm solution was filtered by celite of 3 cm in thickness to adsorb Pd/C. The filtrate was concentrated, recrystallized by methanol, stood still, filtered, and dried in vacuo to obtain DA1 with a melting point of 69° C. The chemical structure of DA1 was confirmed by $^1$H NMR.

EXAMPLE 1

1.392 g (4 mmole) of 9,9-bis-(4-aminophenyl)fluorene was added into a reactor. The reactor was purged with nitrogen, and 36 g of anhydrous NMP was added. The mixture was agitated at room temperature to form a solution. To the resulting solution 2.4 g (8 mmole) of 4-(2,5-dioxotetra hydrofuran-3-yl)tetralin-1,2-dicarboxylic-anhydride (with a chemical structure as shown in the following formula II), 0.04 g of p-toluene sulfonic acid, 12 g of toluene, and 2.204 g (4 mmole) of DA1 monomer were added. The mixture was heated at 180° C. for 10~12 hours to obtain a polyimide solution. The polyimide solution was poured into a large quantity of methanol to form a white precipitation. The precipitate was washed with methanol, filtered, and dried in vacuo at 80° C. to obtain a white polyimide powder (PI-1) having an inherent viscosity of 1.26 dl/g. The inherent viscosity was obtained by measuring a viscosity of a solution formed by dissolving 0.5 g of polyimide in 100 ml of NMP solvent at 25° C.

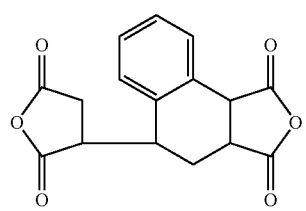

(II)

An appropriate amount of polyimide powder (PI-1) was diluted in a mixture solvent of NMP/BC (NMP:BC=3:1) to form a resin solution with a solid content of 8%. The resulting solution was added with 0.01% (based on the total weight) of polyethylene glycol perfluoroalkyl ether to form an alignment film solution (M-1) by stirring intensively. The alignment film solution was coated on a clean ITO substrate, followed by curing in an oven at 200~250° C. until fully dry. Next, the substrate was removed from the oven and cooled to room temperature.

EXAMPLE 2

Except altering the amount of the diamino compound and the di anhydride compound used, the steps of Example 1 were repeated to obtain a white polyimide powder (PI-2), an alignment film solution (M-2), and a coated substrate. The amount of 9,9-bis-(4-aminophenyl)fluorene used was 2.064 g (6 mmole); the amount of DA1 monomer used was 1.398 g (2.5 mmole); and the amount of dicarboxylic-anhydride (II) used was 2.538 g (8.5 mmole). The inherent viscosity of the polyimide PI-2 measured was 0.92 dl/g.

EXAMPLE 3

2.097 g (6 mmole) of 9,9-bis-(4-aminophenyl)fluorene was poured into a reactor. The reactor was purged with nitrogen, and filled with 36 g of anhydrous NMP. The mixture was agitated at room temperature to form a solution, and then added with 2.481 g (10 mmole) of bicyclo(2,2,2) oct-7-ene-2,3,5,6-tetracarboxylic dianhydride (having the formular III), 0.04 g of p-toluenesulfonic acid, 25 g of toluene, and 2.204 g (4 mmole) of DA1 monomer. The resulting mixture was heated at 180° C. for 10~12 hours to obtain a polyimide solution. The polyimide solution was poured into a large quantity of methanol to form a white precipitation. The precipitate was washed with methanol, filtered, and dried in vacuo at 80° C. for 8 hours, to obtain a white polyimide powder (PI-3) with an inherent viscosity of 1.55 dl/g.

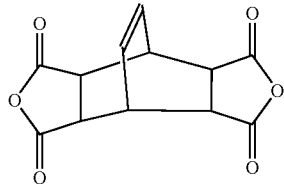

(III)

By repeating the steps of Example 1, the polyimide powder (PI-3) was used to prepare an alignment film solution (M-3) having a solid content of 8%, and a coated ITO substrate.

EXAMPLE 4

1.565 g (4.5 mmole) of 9,9-bis-(4-aminophenyl)fluorene was added into a reactor. The reactor was purged with nitrogen, and 36 g of anhydrous NMP was added. The mixture was agitated at room temperature to form a solution, and then added with 1.959 g (9 mmole) of pyromellitic dianhydride, 0.04 g of p-toluenesulfonic acid, 12 g of toluene, and 2.474 g (4.5 mmole) of DA1 monomer. The resulting mixture was heated at 180° C. for 10~12 hours to obtain a polyimide solution. The polyimide solution was poured into a large quantity of methanol to form a white precipitation. The precipitate was washed with methanol, filtered, and dried in vacuo at 80° C. for 8 hours, to obtain a white polyimide powder (PI-4) with an inherent viscosity of 1.52 dl/g.

By repeating the steps of Example 1, the polyimide powder (PI-4) was used to prepare an alignment film solution (M-4) having a solid content of 8%, and a coated ITO substrate.

CONTROL EXAMPLE A 3.485 g (10 mmole) of 9,9-bis-(4-aminophenyl)fluorene was poured into a reactor. The reactor was purged with nitrogen, and 36 g of anhydrous NMP was added. The mixture was agitated at room temperature, and then added with 3 g (10 mmole) of dicarboxylic-anhydride (II) used in Example 1, 0.04 g of p-toluenesulfonic acid, and 12 g of toluene. The resulting mixture was heated at 180° C. for 10~12 hours to obtain a polyimide solution. The polyimide solution was poured into a large quantity of methanol to form a white precipitation. The precipitate was washed with methanol, filtered, and dried in vacuum at 80° C. for 8 hours, to obtain a white polyimide powder (PI-A) having an inherent viscosity of 1.40 dl/g.

By repeating the steps of Example 1, the polyimide powder (PI-A) was used to prepare an alignment film solution (M-A) with a solid content of 8%, and a coated ITO substrate.

CONTROL EXAMPLE B 5.51 g (10 mmole) of DA1 monomer was poured into a reactor. The reactor was purged with nitrogen, and 36 g of anhydrous NMP was poured into the reactor. The mixture was agitated at room temperature to form a solution, and then added with 2.481 g (10 mmole) of tetracarboxylic dianhydride (Formula III) used in Example 3, 0.04 g of p-toluenesulfonic acid, and 12 g of toluene. The resulting mixture was heated at 180° C. for 10~12 hours to obtain a polyimide solution. The polyimide solution was poured into a large quantity of methanol to form a white precipitation. The precipitate was washed with methanol, filtered, and dried in vacuum at 80° C. for 8 hours, to obtain a white polyimide powder (PI-B) having an inherent viscosity of 1.15 dl/g.

By repeating the steps of Example 1, the polyimide powder (PI-B) was used to prepare an alignment film solution (M-B) with a solid content of 8%, and a coated ITO substrate.

In order to evaluate the features of the present invention, the ITO glass substrates with the alignment film coating on the surfaces thereof were subjected to the following evaluation tests:

I. Measurement of the Pretilt Angle of the Alignment Film:

An ITO glass substrate with an alignment film coating on the surface thereof was subjected to a buffing treatment by a buffing machine. After being assembled into a test LCD panel with 5 cm×5 cm area and 50 μm gapping, a liquid crystal (Merck ZLI-6608) was injected into the panel. The panel was sealed and the pretilt angle thereof was measured by crystal rotation method.

II. Measurement of the Alignment Properties:

The test LCD panel was driven and a polarized microscope was used to observe any occurrences of an abnormal domain.

III. Test of the Coating Uniformity of the Alignment Film:

A silicon wafer was mounted on a spin coater. A predeterminded amount of alignment film solution was spin coated with 500 rpm*5 sec and 3000 rpm*20 sec. After spin coating, the wafer was baked on a hot plate at 80° C. for 10 minutes. The occurrence of any de-wetting or uneven coating on the alignment layer coating surface of the silicon wafer was determined by visual observation.

IV. Test of the Alignment Uniformity and Stability

The LCD panel was subjected to a thermal treatment at 120° C./30 min. A polarized microscope with 100 times magnification was used to observe the occurrence of any abnormal domain: when the two polarization plates were switched to a parallel direction, the LCD panel should exhibit a full black non-transparent state; when the polarization plates were switched to a vertical direction, the LCD panel should exhibit a transparent state. This test was used to observe whether the LCD panel had a high contrast property.

The test results are shown in Table 1.

TABLE 1

| | Polyimide | Pretilt angle (°) | brightness | Alignment characteristics (domain) | Alignment stability |
|---|---|---|---|---|---|
| Example 1 | PI-1 | 89.1 | Good | excellent | excellent |
| Example 2 | PI-2 | 88.5 | Good | excellent | excellent |
| Example 3 | PI-3 | 88.6 | Good | excellent | excellent |
| Example 4 | PI-4 | 89.0 | Good | excellent | excellent |
| Control Example A | PI-A | 2.2 | Good | poor | poor |
| Control Example B | PI-B | 89.1 | Dark brown | fair | fair |

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

The invention claimed is:

1. A polyimide for a vertical alignment film composition for LCD having the following structure (I):

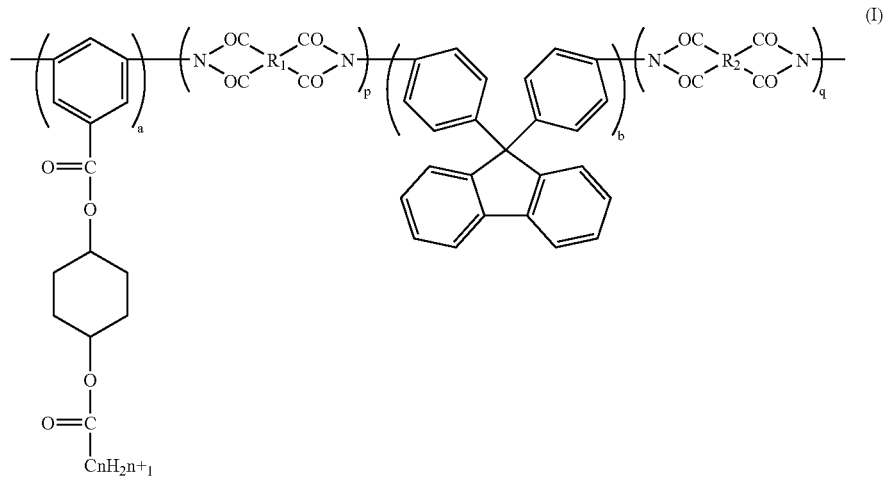

wherein $R_1$ and $R_2$ are same or different tetravalent aromatic residues or alkyl residues; n is an integer, and 24>n>6; a:b=1:9 to 9:1; and a+b=p+q.

2. The polyimide as claimed in claim 1, which has an inherent viscosity of 0.04 to 5 dl/g.

3. The polyimide of claim 1, wherein a:b=4:1 to 1:1.

4. The polyimide as claimed in claim 1, wherein n is 12.

5. A vertical alignment film composition for LCD, which comprises:

(A) polyimide (I) as claimed in claim 1;
(B) an organic solvent capable of dissolving polyimide (I); and
(C) a planarization promoter capable of promoting a uniform coating of the composition after drying thereof.

6. The vertical alignment film composition as claimed in claim 5, wherein said organic solvent (B) is an amide solvent, an ethylene glycol ether, or a mixture thereof.

7. The vertical alignment film composition as claimed in claim 6, wherein said amide solvent is N-methyl pyrrolidone, and said ethylene glycol ether is butyl cellulose.

8. The vertical alignment film composition as claimed in claim 6, wherein said organic solvent (B) is a mixture solvent of said amido solvent and said ethylene glycol ether solvent in a ratio of 80:20~50:50.

9. The vertical alignment film composition as claimed in claim 8, wherein said mixture solvent has a ratio of said amido solvent to said ethylene glycol ether solvent of 70:30~60:40.

10. The vertical alignment film composition as claimed in claim 5, wherein said planarization promoter (C) comprises a non-ionic surfactant capable of reducing the surface tension of said vertical alignment film composition.

11. The vertical alignment film composition as claimed in claim 10, wherein said non-ionic surfactant is polyethylene glycol perfluoroalkyl ether or polypropylene glycol perfluoroalkyl ether.

12. The vertical alignment film composition as claimed in claim 5, which comprises, based on the total weight of said composition, 0.1~0.001% of said planarization promoter (C).

13. The vertical alignment film composition as claimed in claim 12, which comprises, based on the total weight of said composition, 0.1~10.01% of said planarization promoter (C).

14. The vertical alignment film composition as claimed in claim 5, which has a non-volatile content which is in a weight ratio of 3~10%.

15. The vertical alignment film composition as claimed in claim 14, which has a non-volatile content which is in a weight ratio of 4~8%.

* * * * *